March 12, 1957 — N. C. FOSTER — 2,785,383
SYNTHETIC COPOLYMER RESINOUS INSULATING COMPOSITIONS
Filed April 29, 1954

INVENTOR
Newton C. Foster.
BY
ATTORNEY

United States Patent Office 2,785,383
Patented Mar. 12, 1957

2,785,383

SYNTHETIC COPOLYMER RESINOUS INSULATING COMPOSITIONS

Newton C. Foster, Pittsburgh, Pa., assignor to Westinghouse Electric Corporation, East Pittsburgh, Pa., a corporation of Pennsylvania Application April 29, 1954, Serial No. 426,445

11 Claims. (Cl. 336—96)

The present invention relates to electrical insulation, and has particular reference to completely reactive synthetic copolymer resinous compositions suitable for use in the insulation of electrical apparatus.

A resinous material, to be satisfactory for use as insulation on electrical apparatus, should be relatively flexible and it should have high dielectric strength at the elevated temperatures frequently encountered in service of such apparatus. The insulation also should have high thermal stability and it should undergo little, if any, decomposition even during high temperature operation of the apparatus.

Electrical apparatus including motors, coils, capacitors, transformers, and the like, frequently is exposed to adverse weather conditions, particularly rainfall, corrosive atmospheres, and the like. The electrical apparatus used in aircraft, for example, must be provided with insulation capable of functioning satisfactorily in the relatively high and low humidity conditions encountered in arctic regions as well as in the tropics. To be completely satisfactory, the insulation applied to such electrical apparatus should protect the same against such adverse weather conditions, as well as electrically insulate the electrical conductors from one another under the operating conditions frequently encountered during the service of such apparatus.

Heretofore, various resinous compositions have been proposed for application as insulation for electrical apparatus. Certain of these compositions, however, have not proved to be completely satisfactory. For example, certain of the proposed insulating materials, after application to electrical apparatus, function satisfactorily only so long as they remain dry. When exposed to high humidity conditions or immersion in water, such compositions frequently tend to absorb moisture and gradually lose their resistance properties.

Some resinous materials which have satisfactory electrical and physical insulating properties when applied to electrical apparatus, have the disadvantage of a relatively short shelf-life as evidenced by excessive thickening or even gelling of the composition during storage and shipping to distant points prior to its application to electrical apparatus.

According to the present invention, completely reactive synthetic copolymer resinous compositions are provided which are suitable for application as exterior encapsulating coatings for electrical apparatus. There also are provided completely reactive synthetic copolymer resinous compositions adapted for penetrating into the interstices of electrical apparatus and completely impregnating the same. These new compositions provide both satisfactory electrical insulation and protection against adverse weather conditions. Furthermore, they have a relatively long shelf-life as evidenced by only minor increases in viscosity on standing even for relatively long periods of time. Moreover, the compositions, after application to electrical apparatus, are capable of withstanding a wide range of temperatures and various corrosive atmospheres and exhibit excellent moisture resistant properties. Furthermore, the compositions provide coatings and impregnants which are unaffected by the normal operation of the apparatus, and, in addition, withstand ordinary wear and tear without chipping, flaking off, or cracking.

The object of the present invention is to provide completely reactive synthetic copolymer resinous compositions which can be stored for relatively long periods of time at elevated temperatures without gelling and which can be thermoset catalytically at will.

Another object of the present invention is to provide completely reactive synthetic copolymer resinous compositions which, when applied to electrical apparatus, provide insulating material therefor having outstanding physical and electrical properties.

A further object of the invention is to provide electrical apparatus solidly impregnated with a cured synthetic copolymer resinous composition.

Another object of the invention is to provide electrical apparatus encapsulated within a cured synthetic copolymer resinous composition.

To indicate more fully the advantages and capabilities of the compositions of the present invention, together with other and further objects thereof, reference is made to the following description, taken in conjunction with the accompanying drawing, wherein Figs. 1–6 illustrate, in schematic form, one preferred sequence of steps which may be followed in applying the compositions of this invention to electrical apparatus.

Figure 1:
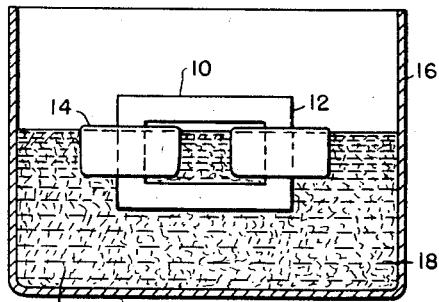
Figure 1 is a vertical cross-sectional view showing a transformer positioned within a tank into which has been introduced an encapsulating composition of this invention.

It will be understood that embodiments of the invention, other than those illustrated and described, employing the same or equivalent principles, may be used, and that structural changes may be made as desired without departing from the true scope of the invention.

Broadly, the completely reactive synthetic copolymer resinous compositions of this invention comprise (A) from 5% to 95% by weight of the product obtained by admixing (a) the reaction product of a resinous polymeric epoxide and at least one higher fatty acid with (b) the acid half-ester obtained upon reacting at least one polyhydric alcohol ester of an hydroxylated unsaturated fatty acid with at least one alpha-beta ethylenically unsaturated dicarboxylic acid and anhydrides thereof, and (B) from 95% to 5% by weight of at least one liquid unsaturated reactive monomer having the group $$>C=C<$$

The expression "completely reactive synthetic copolymer resinous compositions" as used in the specification and claims refers to compositions every component of which reacts completely with every other component thereof to form the finished solid thermoset resin without the evolution of substantial amounts of volatile materials.

In preparing the compositions of this invention according to one preferred procedure, there is produced, initially, a resinous polymeric epoxide. Such resinous polymeric epoxides are also known as glycidyl polyethers. Such epoxides or ethers may be obtained by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4'-dihydroxydiphenylmethyl-methane and 4,4'-dihydroxy-diphenylmethane. In admixture with the named polynuclear phenols, use also may be made of those polynuclear phenols wherein the phenol nuclei are joined by sulfur bridges, such for example as 4,4'-dihydroxy-diphenylsulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

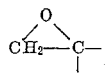

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

Resinous polymeric epoxides or glycidyl polyethers suitable for use in accordance with this invention may be prepared by admixing and reacting from one to two mol proportions of epihalohydrin, preferably epichlorohydrin and about one mol proportion of bis-phenol "A" with at least a stoichiometric amount of alkali based on the amount of halogen in the epihalohydrin.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The resinous polymeric epoxides prepared as described then are esterified with at least one higher fatty acid. The esterification reaction may be carried out in accordance with usual esterification procedures, for example, by heating the resinous polymeric epoxides and the higher fatty acids under reflux and, if desired, in the presence of an esterification catalyst.

More complete esterification may be obtained if azeotropic distillation procedures are employed to carry off the water formed during the reaction. The removal of water during the esterification reaction may be facilitated by carrying out the esterification in the presence of a volatile organic liquid such as toluene, xylene, or the like.

The higher fatty acids which have been found to be suitable for use in the esterification reaction described include those acids having about 8 to 24, and preferably about 12 to 18, carbon atoms per molecule. While saturated higher fatty acids may be used, it is preferred to employ, primarily, unsaturated higher fatty acids. Use of unsaturated acids results in the formation of resinous compositions which, after application to electrical apparatus and curing, oxidize by air drying to yield solid compositions having relatively tough, abrasive-resistant surfaces overlying an inner softer relatively flexible resin. Higher fatty acids which have been found to be particularly suitable are those present in drying oils. Examples of unsaturated fatty acids are oleic, erucic, linoleic, licanic, linolenic, and clupanodonic, and examples of saturated acids are lauric, myristic, palmitic, and stearic. Linseed oil fatty acids, soy bean oil fatty acids and cottonseed oil fatty acids represent desirable commercially avialable acids for the esterification. The acids may be used singly or in any desired admixture of two or more.

From 50% to 90% by weight of (a) the product prepared by reacting the resinous polymeric epoxides with the higher fatty acids then is admixed with 50% to 10% by weight of (b) the acid half-ester reaction product obtained upon reacting at least one polyhydric alcohol ester of an hydroxylated unsaturated fatty acid, such as castor oil, with at least one alpha-beta ethylenically unsaturated dicarboxylic acid or anhydride thereof, such as maleic anhydride. As one example of the preparation of the acid half-ester reaction product (b) the following is given:

About 30 parts by weight of castor oil are admixed with about 10 parts by weight of maleic anhydride, and the mixture is heated at a temperature within the range of about 100° to 140° C. for a period of about two to four hours. The acid half-ester product obtained has a thick molasses-like consistency.

The full acid half-ester is particularly satisfactory for use in accordance with this invention, however, the reaction product of, for example, maleic anhydride and castor oil may be prepared in such proportions that less than all three of the hydroxyl groups in the castor oil are esterified. For example, good results are obtained when an average of two hydroxyl groups per castor oil molecule are esterified, however, an average of at least one hydroxyl group per molecule of castor oil should be esterified.

In preparing the acid half-ester reaction product (b), maleic anhydride is the preferred alpha-beta ethylenically unsaturated dicarboxylic acid because of its availability and high activity. However, the simple substituted maleic anhydrides, such for example, as citraconic anhydride, are equally useful and may replace a part or all of the maleic anhydride. The anhydrides of the dibasic acids are much easier to react than the corresponding acids since they react to form the half-ester without evolving water. With provision to remove water, maleic acid, fumaric acid, citraconic acid and the like, however, can be reacted, generally with increases in reaction temperatures.

For the esterification reaction, castor oil is an economical, convenient and readily available hydroxylated unsaturated fatty acid ester of a polyhydric alcohol. The reaction may be carried out by employing the esters of ricinoleic acid with ethylene glycol, propylene glycol, pentaerythritol and other polyhydric alcohols to replace a part or all of the castor oil. In some cases the esters of monohydroxystearic and dihydroxystearic acids with polyhydric alcohols can be admixed with the castor oil or its equivalent.

The amount of resinous polymeric epoxide, higher fatty acids, and castor oil maleate or the like employed in preparing the compositions of this invention are critical. Thus, it has been determined that there should be as many epoxide groups present on the resinous polymeric epoxide or glycidyl ether as there are carboxyl groups supplied by the higher fatty acids and the castor oil maleate. Free epoxide groups may react with water, and tend to absorb water. It is desirable, therefore, that there be substantially no free epoxide groups in the final composition, since they would tend to absorb moisture with the result that the resulting insulation would gradually deteriorate in its resistance properties. It has been determined that especially satisfactory results are obtained when from 50% to 75% by weight of the resinous polymeric epoxide and 50% to 25% by weight higher fatty acids and castor oil maleate and half-ester or the like, are reacted.

From 5% to 95% by weight of (A) the mixture of esters thus prepared then is dissolved in 95% to 5% by weight of (B) a liquid reactive unsaturated monomer having the group >C=C< to yield a fluid resinous composition which will polymerize completely upon heating in the presence of one or more vinyl addition type polymerization catalysts such as benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts in an amount of from 0.1% to 2% by weight, although somewhat larger or smaller amounts may be employed if desired. Polymerization accelerators such as cobalt naphthenate and azomethines also may be employed. Polymerization also may be effected through the utilization of actinic light.

Examples of liquid reactive unsaturated monomers having the group >C=C<, which are suitable for use in accordance with this invention, include monostyrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, methallyl alcohol, acrylonitrile, methyl vinyl ketone, diallyl ether, butyl methacrylate, allyl acrylate, allyl crotonate, 1,3-chloroprene, and divinyl benzene, as well as mixtures of any two or more of these monomers.

If desired, the mixture of esters and the liquid reactive unsaturated monomers may be stored and shipped in separate containers. It is an important feature of this invention, however, that the uncatalyzed mixture of esters and the monomers may be admixed and stored and shipped in the same container since polymerization will not take place to any substantial degree either at usual room temperatures or at the higher temperatures frequently encountered during the summer months. When the various ingredients of the compositions are admixed and stored in the same container there is, of course, no polymerization catalyst in admixture therewith. Catalytic materials should not be brought into contact with the compositions until just prior to the use of the compositions.

While their use is not essential, if desired, a relatively small proportion of one or more polymerization inhibitors may be incorporated in the mixture of esters and reactive unsaturated monomers to aid in preventing polymerization and extending the shelf-life of the product. Inhibitors which are suitable for this purpose include substituted phenols and aromatic amines. More specific examples of suitable polymerization inhibitors are hydroquinone, resorcinol, tannin, sym. alpha, beta naphthyl p-phenylene diamine, and the like. The inhibitor, if employed, should be present in only relatively small proportions. Thus, amounts less than about 1.0% should be used, with amounts as small as about 0.01% to about 0.1% generally being sufficient.

The following examples illustrate the preparation of completely reactive synthetic copolymer resinous compositions in accordance with the present invention. The parts given are by weight unless otherwise indicated.

EXAMPLE I

Part A

About 54 parts of sodium hydroxide are dissolved in about 600 parts of water in an open kettle provided with a mechanical stirrer. About 3 mols of bis-phenol "A" are added and the resultant mixture is stirred for about 10 minutes at a temperature of about 30° C. Thereafter, approximately 4 mols of epichlorohydrin are added, whereupon the temperature of the resultant mixture increases to about 60° to 70° due to the heat of reaction. About 42 parts of caustic soda dissolved in about 9 parts of water are then added with continuous stirring and the mixture is maintained at a temperature of about 90 to 100° C. for a period of about one hour. The mixture is permitted to separate into two layers. The upper layer is withdrawn and discarded and the lower layer is washed with boiling water to which may be added acetic acid in an amount sufficient to neutralize unreacted caustic soda. A liquid resinous polymeric epoxide is obtained after substantially all of the wash water has been removed.

Part B

About 100 parts of the resinous polymeric epoxide prepared in accordance with the procedure described in part A are admixed with about 100 parts of linseed oil fatty acids. The mixture is heated with stirring to a temperature of about 250° C. and held there for a period of about 5 to 6 hours while carbon dioxide is bubbled therethrough. The resultant mixture then is cooled to a temperature of about 150° C. and about 0.05 part of quinhydrone are added.

Part C

About 80 parts of the material prepared in part B are admixed with about 20 parts of castor oil maleate acid half-ester, and then about 75 parts of the latter mixture are dissolved in about 25 parts of monostyrene. In order to enhance the thixotropic properties of the solution, about 65 parts of the solution thus obtained are admixed with about 35 parts of 325 mesh wet ground mica. Thereafter, approximately 0.5% of benzoyl peroxide catalyst based on the weight of the resinous components are added.

A portion of a resinous material prepared in accordance with the procedure of Example I was applied to strips of tin plate by dipping the same into the material. The material exhibited excellent thixotropic properties, since after baking for four hours at 135° C. each strip was found to be coated on each side with a uniform coating of thermoset resin having a thickness of about 10 to 14 mils.

The moisture resistance of the cured resinous material of this invention is exceptionally high. Thus, an electrical transformer having a quantity of the thermoset resinous material of this invention applied thereto was found to have a megohm resistance, after subjection to humidification at 90° C. at 100% relative humidity for 35 days, which was practically identical with that which it had prior to the humidification tests.

Moreover, a portion of a product prepared in accordance with the procedure described in Example I, which product did not contain any mica, was found to have an exceptionally high shelf-life. The uncatalyzed mica-free product, immediately after preparation, had a Gardner-Holdt viscosity of X, which corresponds to about 12.9 poises. After aging at a temperature of approximately 40° C. for 35 days the composition had a viscosity of Z1, which corresponds to about 27.0 poises. It will be apparent, of course, that this increase in viscosity is very slight and indicates that the composition has an exceptionally long shelf-life.

EXAMPLE II

About 150 parts of the resinous polymeric epoxide prepared in accordance with the procedure set forth in part A of Example I are reacted with about 100 parts of oleic acid, and about 90 parts of the resulting product are admixed with about 10 parts of castor oil maleate. About 65 parts of the resulting ester mixture are dissolved in about 35 parts of monostyrene to which has been added about 0.01% hydroquinone and about 1% by weight of benzoyl peroxide catalyst.

Tin plate strips were dipped into the resinous material thus prepared and baked for about 12 hours at 135° C. The strips then were boiled in water for 12 hours and then soaked in water at room temperature for an additional week's time. The resin coating was flexible, yet hard, and could not be removed from the strips with fingernail pressure.

Figure 2:
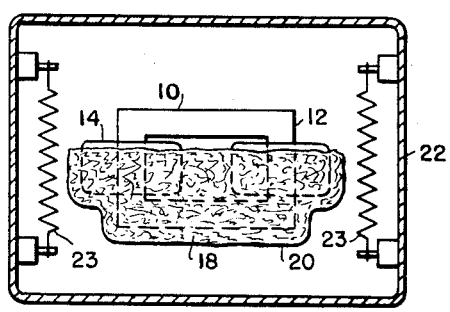
Fig. 2 is a vertical cross-sectional view showing a partially encapsulated transformer in a baking oven.

The invention now will be described with particular reference to the encapsulation and impregnation of an electrical transformer employing the completely reactive synthetic copolymer resinous compositions of this invention. Referring to Fig. 1 of the drawing there is shown a transformer 10, having a core 12 and coils 14, positioned within a tank 16. A completely reactive copolymer resinous composition 18, having mica incorporated therein in an amount sufficient to impart thixotropic properties to the composition, is present in tank 16 to a depth sufficient to cover a major portion of the coils 14 of the transformer 10. When removed from the tank 16, the transformer 10 has a coating 20 of the composition disposed over a major portion of the exterior thereof as a thick imperforate layer closely conforming to the surface contour of the transformer. By reason of the thixotropic properties of the resin 18, the coating 20 will not drip to any material extent. When placed in a baking oven 22 having heating elements 23, as illustrated in Fig. 2, the resin polymerizes into a hard thermoset infusible material to provide an imperforate covering about the greater portion of the exterior surface of the transformer 10.

Figure 4:
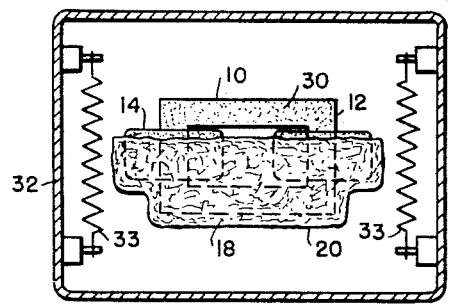
Fig. 4 is a vertical cross-sectional view showing a partially encapsulated and completely impregnated transformer in a baking oven.
Figure 3:
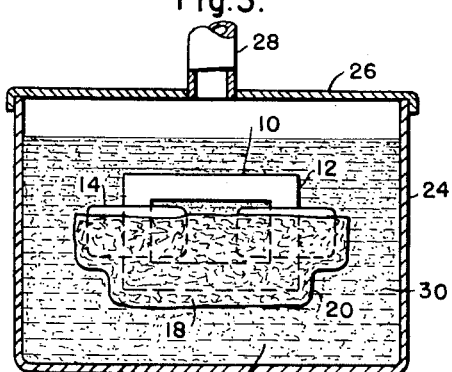
Fig. 3 is a vertical cross-sectional view showing a partially encapsulated transformer in a tank into which has been introduced an impregnating composition of this invention.

The transformer 10 then is placed within an impregnating tank 24, shown in Fig. 3, which can be hermetically sealed by a cover 26 and all the air and moisture evacuated therefrom through a line 28. After being so evacuated, the tank is filled with the completely reactive synthetic copolymer resinous composition 30 of this invention. In this latter instance, mica is not incorporated in the composition since a low viscosity material is desired. The thin resinous material, after it has risen above the top of the coating 20, will flow within the same and penetrate deeply within the transformer 10 and fill all the interstices therein. The impregnated transformer then is removed from the tank and placed in a baking oven 32, having heating elements 33 shown in Fig. 4, where the resinous impregnating composition 30 is caused to polymerize into a solid thermoset impregnate.

Figure 5:
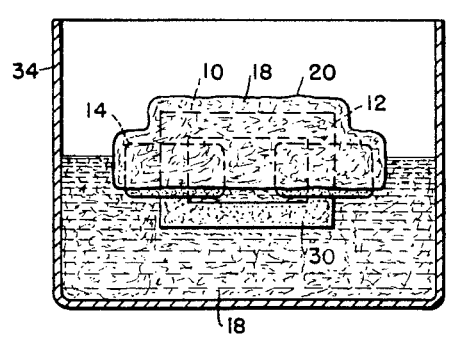
Fig. 5 is a vertical cross-sectional view showing a partially encapsulated and completely impregnated transformer in a tank into which has been introduced an encapsulating composition of this invention.
Figure 6:
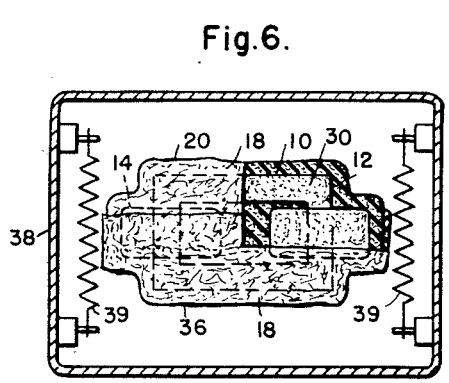
Fig. 6 is a vertical cross-sectional view showing a completely encapsulated and completely impregnated transformer in a baking oven.

The coated and filled transformer 10 then is placed in a tank 34, see Fig. 5, similar to tank 16 of Fig. 1, in inverted position. A quantity of completely reactive synthetic copolymerizable resinous composition 18 having mica incorporated therein then is filled into tank 34 to a level such that it will form a coating 36 which will overlap the original coating 20. After baking in an oven 38 having heating elements 39, as shown in Fig. 6, the transformer has its complete outer surface protected by the overlapping coatings 20 and 36 which encapsulate the transformer and insulate the same electrically and protect the transformer against adverse weather conditions.

It has been determined that finely divided inorganic flake-like materials such as mica flakes, in amounts within the range of about 25% to about 50% by weight of the composition, impart improved thixotropic properties to the compositions of this invention. Other finely divided inorganic materials such as asbestos, silica, glass or the like may be used, if desired, although such materials are not as satisfactory as mica flakes for this purpose.

The relatively thick resinous material containing mica or the like is capable of bridging small gaps of ⅛" width without penetrating far into the fine interstices that may exist in certain electrical apparatus. Generally, the thick resinous material when admixed with mica or the like in the proportions indicated herein permits the provision of a relatively thick exterior coating which may be from 5 mils to ¹⁄₁₆" or more in thickness. When it is desired to coat relatively large pieces of electrical equipment it may be desirable to reinforce the coating with wrappings of tapes of inorganic fibrous materials to provide adequate mechanical strength characteristics.

Encapsulating procedures other than the one described herein may be carried out by employing the compositions of this invention. Thus, electrical apparatus may be encapsulated, using the present compositions, according to the process disclosed in application Serial No. 225,808, copending herewith. Moreover, the present compositions may be applied as coatings to coils and the like by conventional dipping and surface coating procedures.

The compositions of this invention are suitable for use in making resinous products of many kinds. Thus, they may be used as moldings, laminates, and the like produced by applying the resin to sheets of glass cloth, asbestos cloth or the like. Furthermore, they may be used in preparing cast members formed by pouring the composition in a mold and curing to shape to form, for example, boats, household appliances, kitchen utensils, and the like. The compositions also have utility as potting resins for use in conjunction with electronic equipment of many kinds.

While the present invention has been described with reference to particular embodiments and examples, it will be understood, of course, that modifications, substitutions and the like may be made therein without departing from the true scope of the invention.

I claim as my invention:

1. A completely reactive synthetic copolymerizable resinous composition comprising (A) from 5% to 95% by weight of the product obtained by admixing (a) the ester reaction product of a resinous polymeric epoxide and at least one higher fatty acid with (b) the acid half ester obtained upon reacting at least one polyhydric alcohol ester of an hydroxylated unsaturated fatty acid with at least one alpha-beta ethylenically unsaturated dicarboxylic acid and anhydrides thereof, the materials being present in amounts such that there are as many epoxide groups on the resinous polymeric epoxide as the total number of carboxyl groups supplied by the said higher fatty acids and the said reaction product of the fatty acid esters and the alpha-beta ethylenically unsaturated dicarboxylic acids, and (B) from 95% to 5% by weight of a liquid unsaturated reactive monomer of a vinyl compound having the group >C=C<, said monomer being copolymerizable with (a).

2. A completely reactive synthetic copolymerizable resinous composition as set forth in claim 1 which contains a polymerization inhibitor.

3. A completely reactive synthetic copolymerizable resinous composition as set forth in claim 1 which contains an addition-type polymerization catalyst.

4. A completely reactive synthetic copolymerizable resinous composition as set forth in claim 1 which contains finely divided inorganic flake-like insulating material in an amount sufficient to impart thixotropic properties thereto.

5. A solid resinous copolymer comprising the cured reaction product of a completely reactive synthetic copolymerizable resinous composition comprising (A) from 5% to 95% by weight of the product obtained by admixing (a) the ester reaction product of a resinous polymeric epoxide and at least one higher fatty acid with (b) the acid half-ester obtained upon reacting at least one polyhydric alcohol ester of an hydroxylated unsaturated fatty acid with at least one alpha-beta ethylenically unsaturated dicarboxylic acid and anhydrides thereof, the materials being present in amounts such that there are as many epoxide groups on the resinous polymeric epoxide as the total number of carboxyl groups supplied by the said higher fatty acids and the said reaction product of the fatty acid esters and the alpha-beta ethylenically unsaturated dicarboxylic acids, and (B) from 95% to 5% by weight of a liquid unsaturated reactive monomer of a vinyl compound having the group >C=C<, said solid resinous copolymer having been prepared by admixing (A) and (B) and heating the same in the presence of an addition-type polymerization catalyst.

6. A copolymerizable resinous composition comprising (a) the ester reaction product of a resinous polymeric epoxide and at least one higher fatty acid with (b) the acid half-ester of at least one polyhydric alcohol ester of an hydroxylated unsaturated fatty acid and at least one alpha-beta ethylenically unsaturated dicarboxylic acid and anhydrides thereof, the materials being present in amounts such that there are as many epoxide groups on the resinous polymeric epoxide as the total number of carboxyl groups supplied by the said higher fatty acids and the said reaction product of the fatty acid esters and the alpha-beta ethylenically unsaturated dicarboxylic acids.

7. A copolymerizable resinous composition comprising (A) from 5% to 95% by weight of a mixture comprising (a) the ester product obtained by reacting (1) one mol of bisphenol "A" and from one to two mols of epichlorohydrin with at least a stoichiometric amount of alkali based on the amount of chlorine in the epichlorohydrin with (2) the higher fatty acids derivable from linseed oil and (b) castor oil maleate, and (B) from 95% to 5% by weight of monostyrene.

8. An insulated electrical member comprising an electrical conductor and a cured solid resinous copolymer disposed within the interstices of the electrical member and completely filling them, the cured solid resinous copolymer comprising a completely reactive synthetic copolymerizable resinous composition comprising (A) from 5% to 95% by weight of a mixture comprising (a) the ester reaction product of a resinous polymeric epoxide and at least one higher fatty acid and (b) the acid half-ester obtained upon reacting at least one polyhydric alcohol ester of a hydroxylated unsaturated fatty acid with at least one alpha-beta ethylenically unsaturated dicarboxylic acid and anhydrides thereof, the materials being present in amounts such that there are as many epoxide groups on the resinous polymeric epoxide as the total number of carboxyl groups supplied by the said higher fatty acids and the said reaction product of the fatty acid esters and the alpha-beta ethylenically unsaturated dicarboxylic acids, and (B) from 95% to 5% by weight of a liquid unsaturated reactive monomer of a vinyl compound having the group >C=C<, said monomer being copolymerizable with (a).

9. An insulated electrical member comprising an electrical conductor and a layer of a cured, solid resinous copolymer applied to the exterior surface thereof, said cured solid resinous copolymer comprising a completely reactive synthetic copolymerizable resinous composition comprising (A) from 5% to 95% by weight of the product obtained by admixing (a) the ester reaction product of a resinous polymeric epoxide and at least one higher fatty acid with (b) the acid half-ester obtained upon reacting at least one polyhydric alcohol ester of a hydroxylated unsaturated fatty acid with at least one alpha-beta ethylenically unsaturated dicarboxylic acid and anhydrides thereof, the materials being present in amounts such that there are as many epoxide groups on the resinous polymeric epoxide as the total number of carboxyl groups supplied by the said higher fatty acids and the said reaction product of the fatty acid esters and the alpha-beta ethylenically unsaturated dicarboxylic acids, and (B) from 95% to 5% by weight of a liquid unsaturated reactive monomer of a vinyl compound having the group >C=C<, said monomer being copolymerizable with (a) and said resinous copolymer having incorporated therein finely divided inorganic flake-like insulating material in an amount sufficient to impart thixotropic properties to the resin.

10. An insulated electrical member comprising an electrical conductor, a relatively thick layer of a cured solid resinous copolymer applied to the exterior surface of said member to provide an outer encapsulating shell therefor, and a cured solid resinous copolymer disposed within and completely filling the encapsulating shell and impregnating the interstices of said member, the cured solid resinous copolymer comprising a completely reactive synthetic copolymerizable resinous composition comprising (A) from 5% to 95% by weight of a product obtained by admixing (a) the ester reaction product of a resinous polymeric epoxide and at least one higher fatty acid with (b) the acid half-ester obtained upon reacting at least one polyhydric alcohol ester of a hydroxylated unsaturated fatty acid with at least one alpha-beta ethylenically unsaturated dicarboxylic acid and anhydrides thereof, the materials being present in amounts such that there are as many epoxide groups on the resinous polymeric epoxide as the total number of carboxyl groups supplied by the said higher fatty acids and the said reaction product of the fatty acid esters and the alpha-beta ethylenically unsaturated dicarboxylic acids, and (B) from 95% to 5% by weight of a liquid unsaturated reactive monomer of a vinyl compound having the group

>C=C< said monomer being copolymerizable with (a) and the relatively thick layer of cured solid resinous copolymer encapsulating said member having finely divided inorganic flake-like insulating material incorporated therein in an amount sufficient to impart thixotropic properties to the resin.

11. An insulated electrical member as set forth in claim 10 wherein said member comprises a transformer having a magnetic core and electrical windings which comprise the electrical conductor, the encapsulating shell enclosing both the magnetic core and the electrical windings.

References Cited in the file of this patent

UNITED STATES PATENTS

| | | |
|---|---|---|
| 2,414,525 | Hill | Jan. 21, 1947 |
| 2,596,737 | Tess | May 13, 1952 |